United States Patent
Schönhuber et al.

(10) Patent No.: US 8,083,259 B2
(45) Date of Patent: Dec. 27, 2011

(54) PYROTECHNICAL ACTUATOR UNIT, METHOD OF MANUFACTURING THE SAME, AND GAS BAG MODULE WITH SUCH ACTUATOR UNIT

(75) Inventors: Georg Schönhuber, Oberneukirchen (DE); Ernst Enzmann, Grassau (DE); Hannes Nuiding, Muehldorf am Inn (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 410 days.

(21) Appl. No.: 12/086,159

(22) PCT Filed: Dec. 8, 2006

(86) PCT No.: PCT/EP2006/011868
§ 371 (c)(1), (2), (4) Date: Dec. 17, 2008

(87) PCT Pub. No.: WO2007/065715
PCT Pub. Date: Jun. 14, 2007

(65) Prior Publication Data
US 2009/0167006 A1     Jul. 2, 2009

(30) Foreign Application Priority Data

Dec. 8, 2005  (DE) .......................... 10 2005 058 721

(51) Int. Cl.
*B60R 21/26* (2006.01)
(52) U.S. Cl. .................. 280/741; 102/202.14; 102/530
(58) Field of Classification Search .................. 280/736, 280/741; 102/202.14, 530, 531
See application file for complete search history.

(56) References Cited

U.S. PATENT DOCUMENTS

| 3,352,189 | A | * | 11/1967 | Brown ........................... 411/391 |
| 3,449,996 | A | * | 6/1969 | Takahashi ...................... 411/391 |
| 3,530,759 | A | * | 9/1970 | Francis .......................... 411/391 |
| 4,986,708 | A | * | 1/1991 | Moore et al. ..................... 411/20 |
| 5,423,261 | A | * | 6/1995 | Bernardy et al. ........ 102/202.14 |
| 5,763,814 | A | * | 6/1998 | Avory et al. ................ 102/202.7 |
| 5,831,204 | A | * | 11/1998 | Lubben et al. ................ 102/318 |
| 6,526,890 | B1 | | 3/2003 | Vidot et al. |
| 6,616,184 | B2 | * | 9/2003 | Fischer ....................... 280/743.2 |
| 6,672,215 | B2 | * | 1/2004 | Daoud ..................... 102/202.14 |
| 6,746,044 | B2 | * | 6/2004 | Elqadah et al. ............... 280/736 |

(Continued)

FOREIGN PATENT DOCUMENTS
EP          0 600 791 A1     6/1994
(Continued)

*Primary Examiner* — Drew Brown
(74) *Attorney, Agent, or Firm* — Tarolli, Sundheim, Covell & Tummino LLP (57) ABSTRACT

A pyrotechnical actuator unit (10) for a vehicle safety system includes an outer housing (14) made of a plastic material accommodating a pyrotechnical igniter (12) that when activated breaks the outer housing. The outer housing (14) includes first and second plastic parts (18, 20) permanently connected with each other. A gas bag module may have such an actuator unit (10). A method of manufacturing a pyrotechnical actuator unit (10) including an outer housing (14) accommodating a pyrotechnical igniter (12) and made up of first and second housing parts (48, 50) includes: producing the first housing part (48) having a recess for the pyrotechnical igniter (12), inserting the pyrotechnical igniter (12) into the recess, and injection molding the second housing part (50) onto the pyrotechnical igniter (12) and onto a first end (34) of the first housing part (48) to essentially close a receiving space (24) for the pyrotechnical igniter (12).

29 Claims, 5 Drawing Sheets

U.S. PATENT DOCUMENTS

| | | | |
|---|---|---|---|
| 6,796,245 B2 * | 9/2004 | Parker et al. ............... 102/530 |
| 7,240,917 B2 | 7/2007 | Fogle, Jr. et al. |
| 7,293,504 B2 * | 11/2007 | Phelep et al. ............. 102/202.7 |
| 7,357,083 B2 * | 4/2008 | Takahara et al. ............ 102/530 |
| 2005/0057027 A1 | 3/2005 | Fogle, Jr. et al. |
| 2005/0127649 A1 | 6/2005 | Smith |
| 2007/0001439 A1 * | 1/2007 | Matsuda et al. ............. 280/741 |

FOREIGN PATENT DOCUMENTS

EP 1 170 532 A1 10/2006

* cited by examiner

PYROTECHNICAL ACTUATOR UNIT, METHOD OF MANUFACTURING THE SAME, AND GAS BAG MODULE WITH SUCH ACTUATOR UNIT

FIELD OF THE INVENTION

The present invention relates to a pyrotechnical actuator unit for actuating a vehicle safety system, including a pyrotechnical igniter and an outer housing made of a plastic material accommodating the pyrotechnical igniter, the outer housing breaking by an activation of the igniter.

The present invention furthermore concerns a gas bag module for a vehicle safety system including such an actuator unit, and a method of manufacturing a pyrotechnical actuator unit

BACKGROUND OF THE INVENTION

In engineering, in particular in vehicle safety engineering, separation bolts are used as actuator units. These separation bolts are, as a rule, extremely sturdy metal components which are fastened by means of a thread and can take up very high forces. The activation energy required for such separation bolts is correspondingly high, for them to expose housing openings, displace components (occasionally contrary to a pressure force) or separate themselves, for example.

In modern vehicle safety systems, particularly in gas bag modules, attempts are made to adjust the safety system to various parameters of a crash situation increasingly individually. One known and advantageous option here is the use of traction means such as, e.g., tethers which, when released, cause discharge openings to be opened or closed. Moreover, such traction means can also be used to influence the geometry of the gas bag and/or open up an additional gas bag volume.

A tether release device called TAU (tether activation unit) is required for active release of the traction means. These TAUs are generally subjected to shearing stresses by comparatively low transverse force loads. Conventional separation bolts are often oversized and too expensive for these applications.

DE 10 2004 042 359 A1 discloses a pyrotechnical actuator unit according to the generic part of claim 1, which is used to initially fix tether sections in a gas bag module in place and to release them upon an actuation of the actuator unit. This document shows screw-in attachment devices having a metal housing and includes the general remark that it is also possible for a housing of the attachment device to be made of a plastic or synthetic material. It is furthermore mentioned that the threaded screw-in sections of the housing may be designed in the form of a snap-in connector.

SUMMARY OF THE INVENTION

It is the object of the present invention to provide a pyrotechnical actuator unit for moderate loads, in particular transverse force stresses, which may be produced at low cost and is simple to install while requiring little space.

The object is achieved according to the invention by a pyrotechnical actuator unit of the type initially mentioned, the outer housing being made up of a first plastic part and a second plastic part and the two plastic parts being permanently connected with each other. In the cases of application mentioned at the outset, the plastic housing exhibits a reliability similar to that of a metal housing, but is considerably more cost-effective in comparison with conventional metal housings. Compared with a one-piece housing configuration made of plastic, the design comprised of a first plastic part and a second plastic part is somewhat more elaborate, but it does offer the advantage that during production of the actuator unit, the pyrotechnical igniter is subjected to less heat than in the case of, e.g., a one-piece insert-molded plastic casing. Any spurious activation of the igniter as a consequence of a thermal load is thereby largely ruled out.

In one embodiment, the outer housing has a pressure chamber formed therein which is defined by the igniter, on the one hand, and by the outer housing, on the other hand. After an activation of the pyrotechnical igniter, this pressure chamber is of particular advantage to a continuous development of pressure in the outer housing and a defined rupture of the outer housing. Other advantages in manufacturing the pyrotechnical actuator unit, more particularly advantages in terms of process engineering, ensue for design variants in which merely the first plastic part and the pyrotechnical igniter define the pressure chamber.

The pressure chamber is preferably provided in the area of a predefined breaking point of the outer housing. The internal pressure in the pressure chamber rises continuously after an activation of the igniter. Provision of a predetermined breaking point in the area of the pressure chamber allows the place and the moment of breakage of the housing to be predefined in a simple way.

In a further embodiment, the first plastic part and the second plastic part form a receiving space in the outer housing, the receiving space being at least partly occupied by the pyrotechnical igniter.

Here, the pressure chamber may in particular be the remaining portion of the receiving space that is not occupied by the pyrotechnical igniter. Fabrication of the pyrotechnical actuator unit is especially simple in this embodiment since only one single predefined receiving space is to be formed. After assembly of the pyrotechnical igniter, the pressure chamber automatically results as a "residual volume" of the receiving space that is not occupied by the pyrotechnical igniter.

In a further embodiment, the receiving space is bordered by the first plastic part and by the second plastic part. In case at least one of the plastic parts is injection-molded onto the igniter, in this embodiment merely partial areas of the igniter surface are heated when the respective plastic part is joined by injection-molding. As a result, the thermal load and, hence, the risk of a spurious release of the igniter during manufacture of the pyrotechnical actuator unit is low.

In one embodiment, the first plastic part is injection-molded onto the igniter. In this case, the manufacture of the first plastic part is very simple since part of the igniter itself serves as an injection mold. Also, an interlocking connection is produced between the igniter and the first plastic part, so that the igniter is fixed in place in the first plastic part. Since in this embodiment it is not possible to form a pressure chamber between the first plastic part and the igniter, one option is to integrate the pressure chamber into the pyrotechnical igniter. To this end, the igniter may include an igniter cap which is arranged at a distance from a fuel-filled combustion chamber of the igniter in order to form the pressure chamber. The first plastic part is then injection-molded onto the igniter or, to be more precise, the igniter cap of the igniter.

In a further embodiment, the first plastic part is a prefabricated injection-molded part and the second plastic part is injection-molded onto the first plastic part. In this embodiment, a connection between the first and second plastic parts is produced simultaneously with the production of the second plastic part. In this way, the manufacturing expenditure of the pyrotechnical actuator unit is reduced because separate connecting means may be dispensed with.

As an alternative, the two plastic parts are welded to each other. While the separate connecting process slightly raises the manufacturing expenditure, both plastic parts may be prefabricated.

The first plastic part has a first end permanently connected with the second plastic part and a second end opposite the first end, and preferably has a detent portion in the area of the second end to attach the actuator unit. The detent portion, firstly, provides a way of attaching the actuator unit quickly and reliably and, secondly, can be integrally molded onto the first plastic part with little effort.

Preferably, the first plastic part here includes an outer, lateral guide portion which is closer to the second end of the first plastic part than the detent portion. This guide portion further simplifies the installation of the actuator unit on a receiving component.

In a further embodiment, the first plastic part has a first end permanently connected with the second plastic part and a second end opposite the first end, and has an anti-rotation means in the area of the second end. Such anti-rotation means are used in particular to fix rotationally symmetrical actuator units in the peripheral direction after installation thereof.

The present invention further encompasses a gas bag module for a vehicle safety system, including a gas bag, a gas generator, a module housing, and an above-mentioned pyrotechnical actuator unit, in which a traction means is provided which is fixed in place by the actuator unit before an activation of the pyrotechnical igniter and is released after an activation of the pyrotechnical igniter. Since the plastic material used for the outer housing and the preferred detent attachment of the actuator unit are well suited for normal stresses upon traction means release devices, the employment of the pyrotechnical actuator unit as a traction means release device is especially advantageous.

Preferably, one end of the traction means engages a predefined breaking point of the outer housing of the pyrotechnical actuator unit. This ensures that the traction means is quickly and reliably released after an activation of the pyrotechnical igniter.

Alternatively, one end of the traction means may engage a portion of the outer housing of the pyrotechnical actuator unit which after the activation of the pyrotechnical igniter is separated from an attachment section of the actuator unit. In addition to the likewise rapid and reliable release of the traction means, in this variant that portion of the outer housing which separates from the attachment section after the activation of the pyrotechnical igniter is additionally secured by the traction means.

The present invention furthermore relates to a method of manufacturing a pyrotechnical actuator unit, including a pyrotechnical igniter and an outer housing accommodating the pyrotechnical igniter, the outer housing being made up of a first housing part and a second housing part, the method including the following method steps:

(a) the first housing part is produced to have a receiving space for the pyrotechnical igniter;
(b) the pyrotechnical igniter is inserted into the receiving space; and
(c) the second housing part is injection-molded onto the pyrotechnical igniter and onto a first end of the first housing part, so that the receiving space is essentially closed.

This method provides a two-part outer housing for a pyrotechnical igniter, offering the advantage that when the actuator unit is manufactured, the pyrotechnical igniter is not subjected to as much heat as in the case of, e.g., a one-part insert-molded plastic casing. The increase in manufacturing expense for a two-part outer housing is minimized in that, along with the production of the second housing part a connection to the first housing part is established at the same time. A separate method step of connecting the two housing parts can be saved here, as can additional fastening means.

Preferably, the first housing part is produced as an injection-molded part in step (a). The outer housing of the actuator unit is thus essentially made of a plastic material, which results in low material costs and a low weight of the actuator unit.

In one variant of the method, a press fit develops between the pyrotechnical igniter and a side wall of the receiving space in step (b). Owing to the press fit, the igniter is fixed in place relative to the first housing part; a stable intermediate product made up of the pyrotechnical igniter and the first housing part is produced, which is easier to handle in the further process than any loosely fitted parts.

Preferably, in step (b) the pyrotechnical igniter is not fully inserted into the receiving space, so that the igniter and the first housing part form a pressure chamber. This constitutes a very simple way to provide the pressure chamber that is advantageous to a controlled and defined separation of the housing. In case a press fit develops between the pyrotechnical igniter and the side wall of the receiving space, it is made sure at the same time that the injection-molding composition of the second housing part does not penetrate into and fill the pressure chamber when the second housing part is joined by injection-molding in method step (c).

During the fabrication of the first housing part, a stop for the pyrotechnical igniter may be formed in the receiving space. For one thing, method step (b) is given a defined end by this stop; for another thing, the stop allows the pressure chamber volume to be exactly defined.

In a further variant of the method, an interlocking connection develops between the pyrotechnical igniter and the second housing part, so that the igniter is reliably fixed to the second housing part.

In a particularly preferred variant of the method, the first end of the first housing part is fabricated in step (a) so as to be profiled such that after the second housing part is joined by injection-molding and is cured, the two housing parts form a non-detachable interlocking connection. This modified connection prevents any weak point from developing in the connecting region between the first and second housing parts, so that the outer housing reliably breaks at a usually provided predetermined breaking point. In addition, this connection of the two housing parts produces a so-called labyrinth seal, which distinguishes itself by a particularly high degree of tightness. Any undesirable leakage loss after activation of the pyrotechnical igniter can thus be avoided.

BRIEF DESCRIPTION OF THE DRAWINGS

Further features and advantages of the invention will become apparent from the following description of preferred embodiments with reference to the drawings, in which.

DESCRIPTION OF THE EXAMPLE EMBODIMENTS

Figure 1:
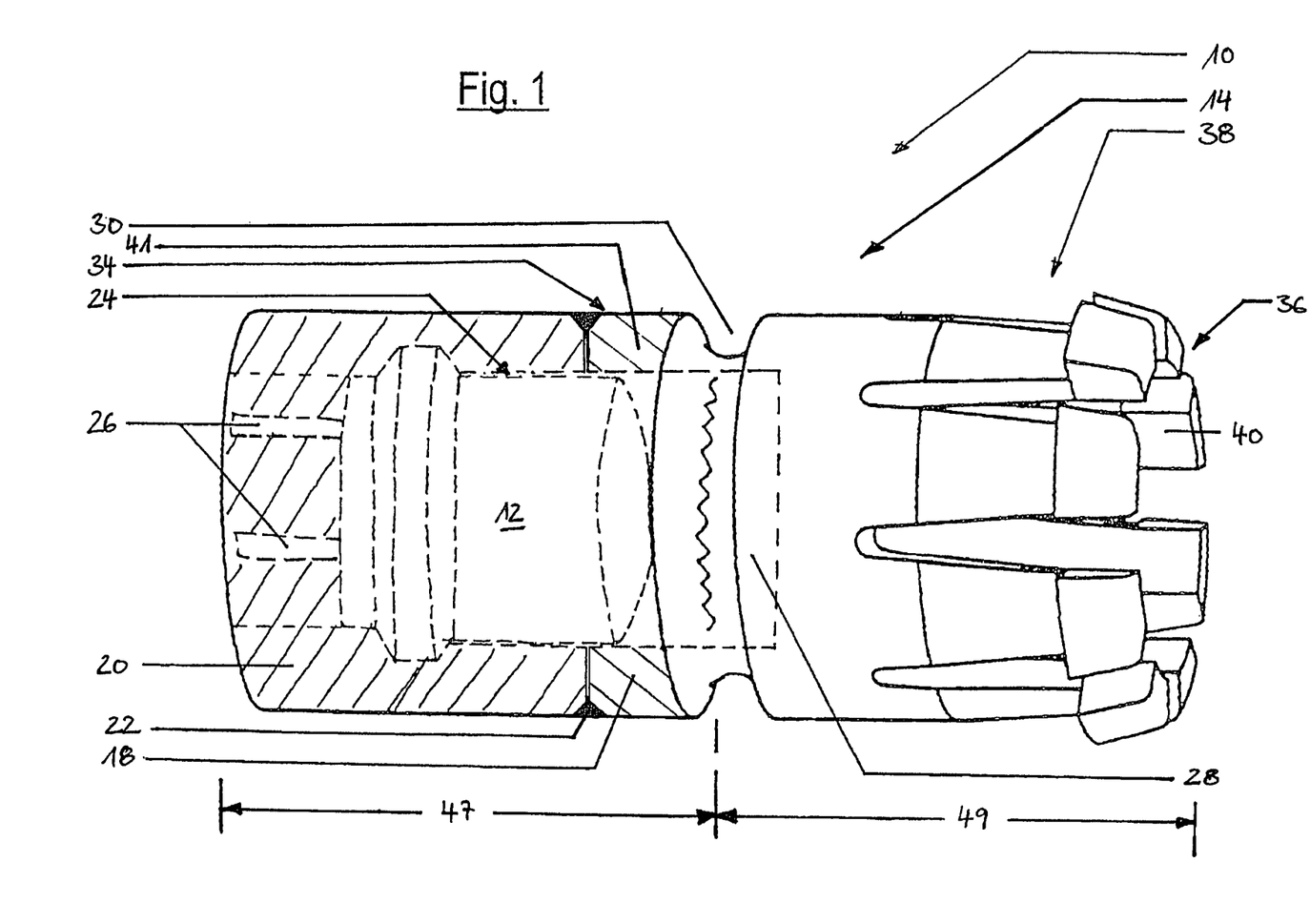
FIG. 1 shows a perspective view of a pyrotechnical actuator unit according to a first embodiment of the invention.

FIG. 1 shows a perspective view of a pyrotechnical actuator unit 10 according to a first embodiment, including a pyrotechnical igniter 12 (illustrated in dashed lines) and an outer housing 14 made of plastic and accommodating the pyrotechnical igniter 12, the outer housing 14 breaking by an activation of the igniter 12. In contrast to a bursting of housing diaphragms or the like, in this context the breaking of the outer housing 14 is actually to be understood to mean a destruction of the housing during which at least one load-bearing housing component breaks into two or more parts. The outer housing 14 consists of a first plastic part 18 and a second plastic part 20, the two plastic parts 18, 20 being connected with each other permanently. In the first embodiment the plastic parts 18, 20 are welded, preferably laser-welded. The respective weld seam is shown schematically in FIG. 1 and is denoted by reference numeral 22. After an activation of the pyrotechnical igniter 12, the outer housing 14, preferably the second plastic part 20 of the outer housing 14, will break.

The first and second plastic parts 18, 20 form a largely closed receiving space 24 in the outer housing 14, the receiving space 24 being at least partly occupied by the pyrotechnical igniter 12, and only contact pins 26 of the igniter 12 projecting through the second plastic part 20 and out of the receiving space 24. The two contact pins serve to connect the igniter 12 to a power source (not shown) which, under predefined conditions, emits a current pulse leading to an activation of the pyrotechnical igniter 12.

In order to attain a controlled pressure evolution and a defined, reproducible rupture of the outer housing 14 upon an activation of the pyrotechnical igniter, the outer housing 14 has a pressure chamber 16 configured therein which is defined by the igniter 12, on the one hand, and by the outer housing 14, on the other hand, and in the first embodiment as illustrated is even defined only by the first plastic part 18 of the outer housing 14.

The receiving space 24 of the outer housing 14 is bordered by the first plastic part 18 and by the second plastic part 20. The remaining portion of the receiving space 24 which is not occupied by the pyrotechnical igniter 12 constitutes the pressure chamber 16 in FIG. 1. The formation of a pressure chamber 16 in the outer housing 14 prevents any local, uncontrollable stress peaks from arising in the walls of the receiving space 24 after an activation of the pyrotechnical igniter 12; rather, the internal pressure in the pressure chamber 16 or in the receiving space 24 rises substantially continuously until the outer housing 14 breaks at its weakest point. To induce a defined and reproducible rupture, the outer housing 14 is provided with a predefined breaking point 30 which is located in the region of the pressure chamber 16. In FIG. 1, this predefined breaking point 30 is an externally surrounding groove, this groove being at the same time adapted to fix a traction means 32 in place, which engages the second plastic part 20 (cf. FIG. 2).

At a first end 34 the first plastic part 18 is welded to the second plastic part 20. In the region of a second end 36 opposite the first end 34, the first plastic part 18 has a detent portion 38 for attaching the actuator unit 10. In FIG. 1, the first plastic part 18 of the pyrotechnical actuator unit 10 features a substantially cylindrical, partly hollow cylindrical shape. The detent portion 38 includes a plurality of detent members 40 distributed over the periphery, which are each integrally molded with the first plastic part 18 at one axial end and have detent hooks at their other, free axial end. The detent hooks project over the outer surface of the outer housing 14 in the radial direction and are movable in the radial direction owing to the elasticity of the detent members 40.

The production of the pyrotechnical actuator unit 10 according to the first embodiment is now briefly described below. The first plastic part is produced as a prefabricated injection-molded part which has a recess formed therein at the first end 34, the recess constituting a portion of the future receiving space 24. The pyrotechnical igniter 12 is then inserted into this recess, preferably forming a press fit with a surrounding wall 41 of the first plastic part 18. However, in this method step the igniter 12 is preferably not completely inserted into the recess, whereby the pressure chamber 16 is produced in a simple manner. To obtain a defined and reproducible pressure chamber volume, a stop is preferably formed in the recess of the first plastic part 18. For this purpose, pins may be integrally molded in the region of the recess, for example, which are used as spacers. As an alternative, the stop may also be in the form of a continuous bead within the recess or a taper provided in the direction of insertion of the igniter 12. The second plastic part 20 is subsequently either injection-molded directly onto the pyrotechnical igniter 12 and/or the first plastic part 18, or it is likewise a prefabricated injection-molded part that is slipped onto the igniter 12. Finally, the two plastic parts 18, 20 are welded to each other, so that they are connected with one another tightly and durably.

In some design variants it is also possible for the second plastic part 20 to be injection-molded onto the igniter 12 first and for the prefabricated first plastic part 18 to be pushed on and to be welded to the second plastic part 20 thereafter.

Figure 2:
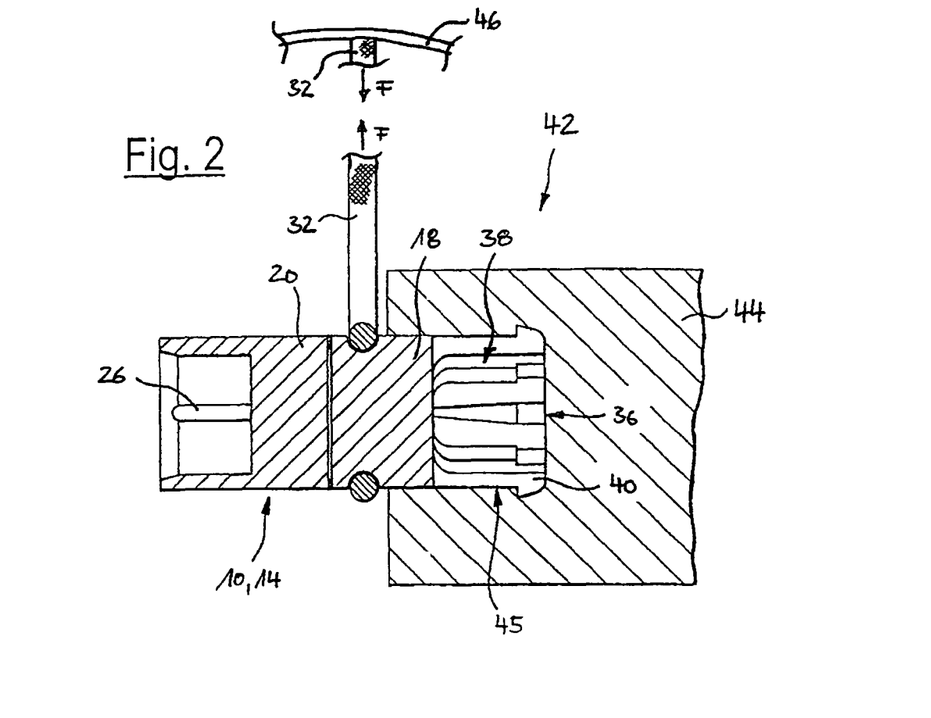
FIG. 2 shows part of a gas bag module according to the invention with an actuator unit of FIG. 1 according to the invention in the installed condition.

FIG. 2 shows a portion of a gas bag module 42 to which the actuator unit 10 is attached. For attachment purposes, a receiving component 44 (such as, e.g., a module housing or a gas generator) of the gas bag module 42 needs to be provided with a substantially cylindrical recess 45 having an undercut. During assembly, the pyrotechnical actuator unit 10 is then introduced into this recess 45 in the axial direction. In the process, the detent members 40 are first elastically deformed radially inward, i.e. toward the housing axis. Eventually, the detent members 40 snap radially outward into a detent position of the pyrotechnical actuator unit 10 to engage with the undercut of the recess 45 of the receiving component 44. The actuator unit 10 is thus attached firmly and reliably to the receiving component 44. As shown in FIG. 2, the traction means 32 can then be fitted to the actuator unit 10.

The traction means 32 is a tether or a tear-resistant cord, for instance, and one end of the traction means 32 is attached to the pyrotechnical actuator unit 10, preferably directly at the predefined breaking point of the outer housing 14. The other, opposite, end of the traction means 32 is connected with a gas bag 46 of the gas bag module 42, for example, the traction means 32 being adapted to be acted upon with a force F upon a deployment of the gas bag 46.

In a further variant embodiment (not illustrated) of the actuator unit 10, the traction means 32 engages a portion 47 (cf. FIGS. 1 and 6) of the outer housing 14, which after the activation of the pyrotechnical igniter 12 is separated from an attachment section 49 (cf. FIGS. 1 and 6) of the pyrotechnical actuator unit 10.

Figure 3:
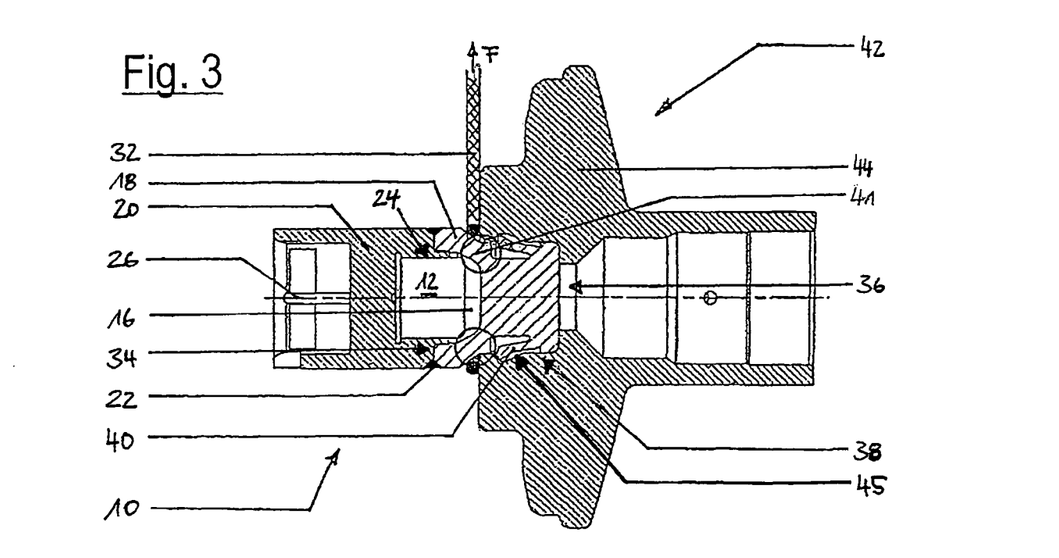
FIG. 3 shows part of a gas bag module according to the invention with an actuator unit according to a second embodiment of the invention in the installed condition.

FIG. 3 shows a part of a gas bag module 42 to which the actuator unit 10 according to a second embodiment is attached, which is very similar to the first embodiment. One difference consists in that here the predefined breaking point 30 is not configured as a groove or notch. Rupture of the outer housing 14 of the actuator unit 10 will occur in the region encircled in FIG. 3, near the surface of the receiving component 44, at a place where the wall 41 of the first plastic part 18 is weakest. The outer housing 14 tapers in this region, so that together with the surface of the receiving component 44 it forms a wedge-shaped groove in which the end to be attached of the traction means 32 may be at least partially accommodated and is thus axially secured.

A further difference from FIG. 2 resides in the design of the detent portion 38 in the area of the second end 36 of the first plastic part 18, which will be discussed in greater detail in the description of FIGS. 7 to 9.

Figure 4:
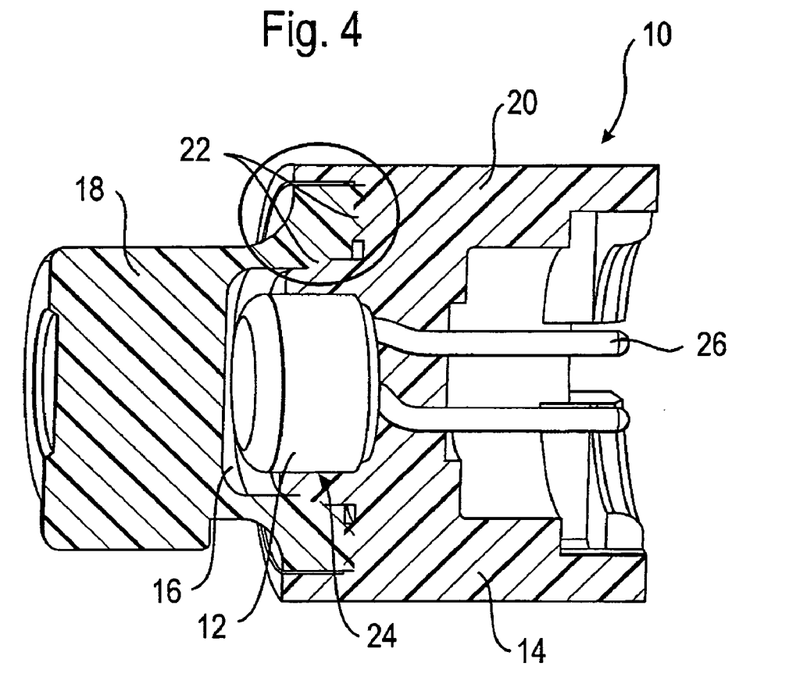
FIG. 4 shows a perspective sectional view of the pyrotechnical actuator unit of FIG. 3 according to the invention.
Figure 5:
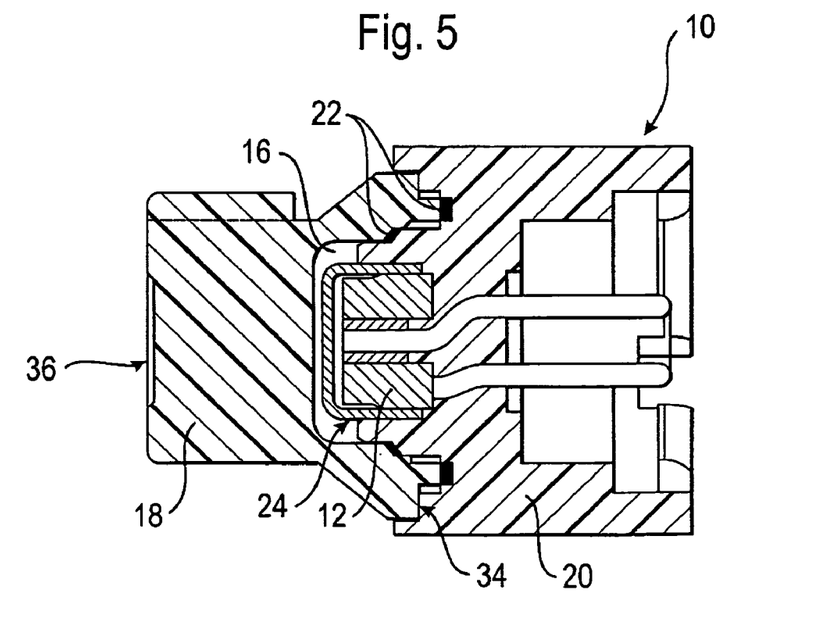
FIG. 5 shows a sectional view of the pyrotechnical actuator unit of FIG. 3, with welding areas highlighted.

FIGS. 4 and 5 show longitudinal sections through the pyrotechnical actuator unit 10 according to FIG. 3, in which the connecting region, only schematically indicated in FIGS. 1 to 3, between the first and second plastic parts 18, 20 is illustrated in one possible exemplary detailed configuration. After a laser welding of the two plastic parts 18, 20, the connecting region (encircled region in FIG. 4) is hardly visible as such any more, because the weld produces a substantially one-piece outer housing 14. In the sectional view of FIG. 5, the surrounding weld regions are drawn in bold.

Figure 6:
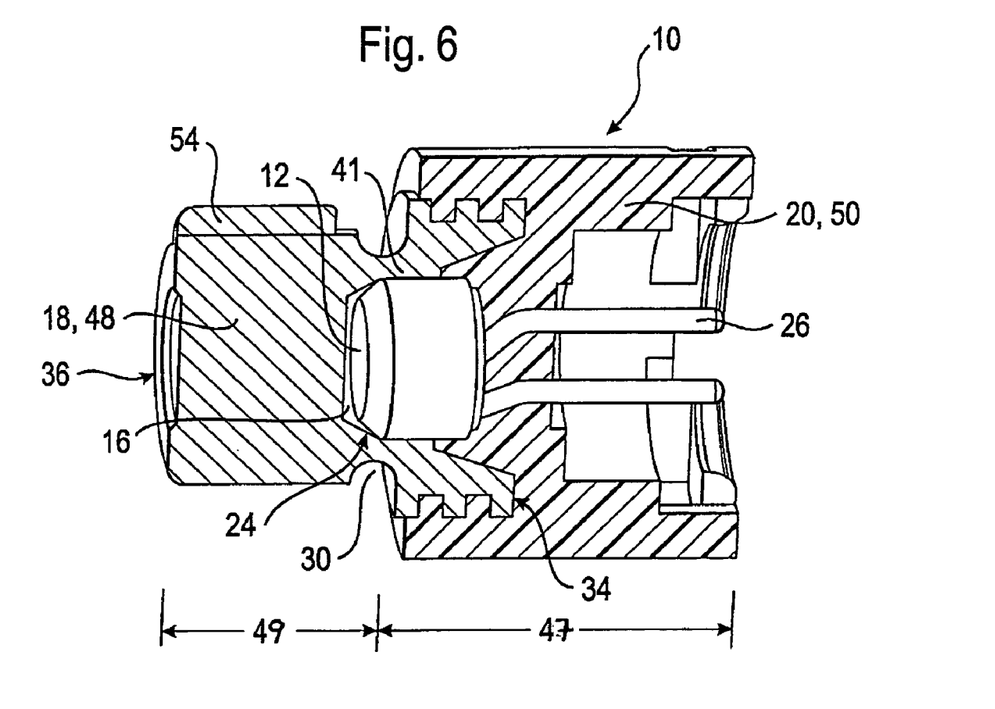
FIG. 6 shows a perspective sectional view of a pyrotechnical actuator unit according to a third embodiment of the invention.

FIG. 6 shows a third embodiment of the pyrotechnical actuator unit 10 in a sectional view, similar to FIG. 4. The essential difference from the preceding embodiments consists in the type of production of the permanent connection between first and second housing parts 48, 50. The second housing part 50 is not welded to the first housing part 48 here, but is directly injection-molded onto the first housing part 48.

The method of manufacturing this pyrotechnical actuator unit 10 including the pyrotechnical igniter 12 and the outer housing 14 which accommodates the pyrotechnical igniter 12 comprises the following steps: at first, the first housing part 48 is produced to have the recess for the pyrotechnical igniter 12, followed by insertion of the igniter 12 into the recess. Finally, the second housing part 50 is injection-molded onto the pyrotechnical igniter 12 and onto the first end 34 of the first housing part 48, so that the receiving space 24 for the pyrotechnical igniter 12 is essentially closed.

In this method, the first housing part 48 may be made from any desired material, including metal, for example. In case the first housing part is made of plastic, the housing parts 48, 50 correspond to the plastic parts 18, 20 described above. In that case, the first housing part 48 is particularly preferably a prefabricated injection-molded part.

FIG. 6 likewise shows that when the pyrotechnical igniter 12 was introduced into the recess, it was not introduced so far that it completely fills the recess in the first housing part 48. The recess in the first housing part 48 is tapered in the direction of insertion of the igniter 12, thus forming a stop for the pyrotechnical igniter 12. This ensures that the first housing part 48 and the pyrotechnical igniter 12 define the pressure chamber 16.

When the pyrotechnical igniter 12 is inserted into the recess, a largely tight press fit develops between the igniter 12 and the surrounding wall 41 of the first housing part 48. This prevents any injection-molding composition from being able to penetrate into and fill the pressure chamber 16 when the second housing part 50 is joined by injection-molding. The process of injection-molding the second housing part 50 onto the pyrotechnical igniter 12 automatically produces an interlocking connection between the igniter 12 and the second housing part 50, so that the igniter 12 and the first and second housing parts 48, 50 are fixed to one another and firmly connected with each other.

The design of the connection of the two housing parts 48, 50 as illustrated in FIG. 6 is particularly advantageous. The first end 34 of the first housing part 48 is produced here to have such a profile that the two housing parts 48, 50 form a non-detachable interlocking connection after the second housing part 50 has been joined by injection-molding and has cured. Without any additional welding, this results in a very firm and reliable connection which does not constitute a weak point of the outer housing 14. Accordingly, the outer housing 14 will reliably rupture at a predefined breaking point 30, rather than in the region connecting the housing parts 48, 50. In addition, the profiling illustrated further provides a kind of labyrinth seal between the first and second housing parts 48, 50, which distinguishes itself by a very high degree of tightness. Any undesirable leakage losses after an activation of the pyrotechnical igniter 12, which have an adverse effect on the pressure development in the pressure chamber 16, are largely avoided in this way.

Figure 7:
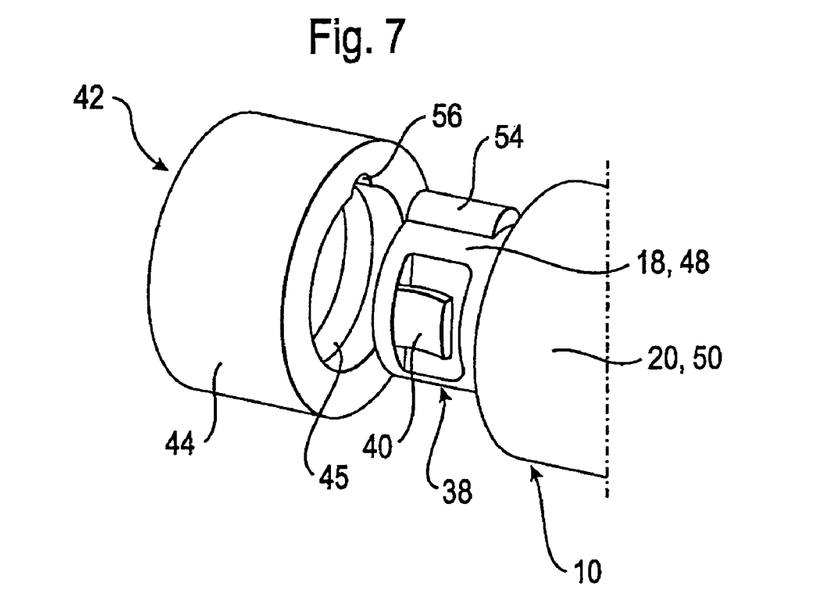
FIG. 7 shows part of a gas bag module according to the invention with the actuator unit of FIG. 6 according to the invention.

FIG. 7 shows a detail of the gas bag module 42 in the area of the connection between the pyrotechnical actuator unit 10 and the receiving component 44 of the gas bag module 42. It can be clearly seen that the first housing part 48 has a detent portion 38 for attachment of the actuator unit 10. Unlike in FIG. 1, however, the first housing part 48 further has an outer, lateral guide portion 52 which is closer to the second end 36 of the first housing part 48 than the detent portion 38. This guide portion 52 makes it easier to fit the pyrotechnical actuator unit 10 to the receiving component 44. Further, an anti-rotation means 54 is provided in the area of the second end 36 of the first housing part 48. In the present case, this anti-rotation means 54 is in the form of a bead which extends in the direction of installation of the actuator unit 10 and cooperates with a groove 56 in the recess 45 of the receiving component 44, so that in the installed condition, any rotation of the actuator unit 10 in relation to the receiving component 44 is prevented.

Figure 8:
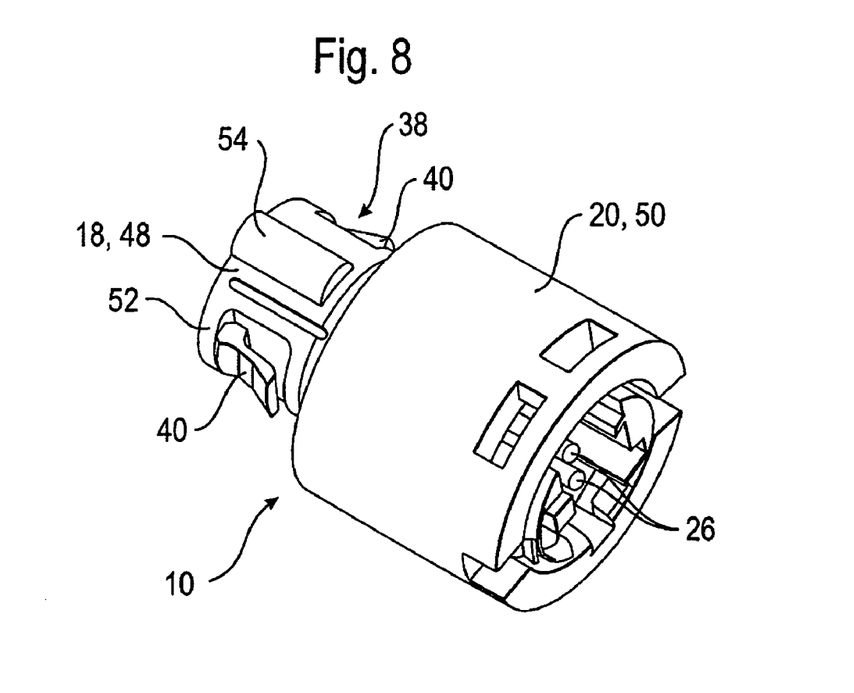
FIG. 8 shows a perspective view of the pyrotechnical actuator unit of FIG. 6.
Figure 9:
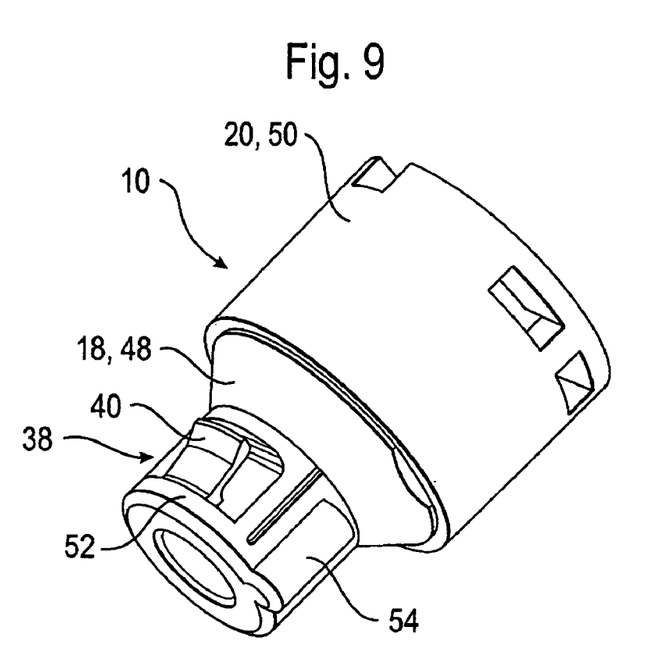
FIG. 9 shows a further perspective view of the pyrotechnical actuator unit of FIG. 6.

FIGS. 8 and 9 show perspective views of the actuator unit 10, where especially the detent members 40 of the detent portion 38 as well as the guide portion 52 and the anti-rotation means 54 are clearly visible. In addition, FIG. 8 illustrates the two contact pins 26 by means of which the pyrotechnical igniter 12 can be activated. In the region of the contact pins 26, the second housing part 48 is configured as a plug connector which is adapted to establish a firm connection with an appropriate counterpart on an electric cable.

The invention claimed is:

1. A pyrotechnical actuator unit for actuating a vehicle safety system, comprising a pyrotechnical igniter (12) and an outer housing (14) made of a plastic material accommodating the pyrotechnical igniter (12), the outer housing (14) having a predefined breaking point (30) adapted to be engaged by a traction means (32), wherein the outer housing (14) is made up of a first plastic part (18) and a second plastic part (20), the two plastic parts (18, 20) being permanently connected with each other.

2. The pyrotechnical actuator unit according to claim 1, wherein the outer housing (14) has a pressure chamber (16) formed therein which is defined by the igniter (12), on the one hand, and by the outer housing (14), on the other hand.

3. The pyrotechnical actuator unit according to claim 2, wherein the igniter (12) and the first plastic part (18) define the pressure chamber (16).

4. The pyrotechnical actuator unit according to claim 2, wherein the pressure chamber (16) is provided in the area of the predefined breaking point (30) of the outer housing (14).

5. The pyrotechnical actuator unit according to claim 1, wherein the first plastic part (18) and the second plastic part (20) form a receiving space (24) in the outer housing (14), the receiving space (24) being at least partly occupied by the pyrotechnical igniter (12).

6. The pyrotechnical actuator unit according to claim 5, wherein the pressure chamber (16) is the remaining portion of the receiving space (24) that is not occupied by the pyrotechnical igniter (12).

7. The pyrotechnical actuator unit according to claim 5, wherein the receiving space (24) is bordered by the first plastic part (18) and by the second plastic part (20).

8. The pyrotechnical actuator unit according to claim 1, wherein the first plastic part (18) is injection-molded onto the igniter (12).

9. The pyrotechnical actuator unit according to claim 1, wherein the first plastic part (18) is a prefabricated injection-molded part and the second plastic part (20) is injection-molded onto the first plastic part (18).

10. The pyrotechnical actuator unit according to claim 1, wherein the two plastic parts (18, 20) are welded to each other.

11. The pyrotechnical actuator unit according to claim 1, wherein the first plastic part (18) has a first end (34) permanently connected with the second plastic part (20) and a second end (36) opposite the first end (34), and has a detent portion (38) in the area of the second end (36) to attach the actuator unit (10).

12. The pyrotechnical actuator unit according to claim 11, wherein the first plastic part (18) includes an outer, lateral guide portion (52) which is closer to the second end (36) of the first plastic part (18) than the detent portion (38).

13. The pyrotechnical actuator unit according to claim 1, wherein the first plastic part (18) has a first end (34) permanently connected with the second plastic part (20) and a second end (36) opposite the first end (34), and has an anti-rotation means (54) in the area of the second end (36).

14. A gas bag module for a vehicle safety system, comprising a gas bag (46), a gas generator, a module housing, and the pyrotechnical actuator unit (10) according to claim 1, wherein the traction means (32) is provided which is fixed in place by the actuator unit (10) before an activation of the pyrotechnical igniter (12) and is released after an activation of the pyrotechnical igniter (12).

15. The gas bag module according to claim 14, wherein one end of the traction means (32) engages a predefined breaking point (30) of the outer housing (14) of the pyrotechnical actuator unit (10).

16. The gas bag module according to claim 14, wherein one end of the traction means (32) engages a portion (47) of the outer housing (14) of the pyrotechnical actuator unit (10) which after the activation of the pyrotechnical igniter (12) is separated from an attachment section (49) of the pyrotechnical actuator unit (10).

17. The pyrotechnical actuator unit according to claim 1, wherein the outer housing (14) is rupturable at the predefined breaking point (30) to release the traction means (32) from the breaking point (30).

18. The pyrotechnical actuator unit according to claim 1, wherein the first plastic part (18) defines the breaking point (30), the igniter (12) being arranged in such immediate area of the breaking point (30) that the outer housing (14) is breakable upon activation of the igniter (12).

19. A method of manufacturing a pyrotechnical actuator unit (10) comprising a pyrotechnical igniter (12) and an outer housing (14) accommodating the pyrotechnical igniter (12), the outer housing (14) being made up of a first housing part (48) and a second housing part (50), wherein the following steps:
  (a) the first housing part (48) is produced to have a recess for the pyrotechnical igniter (12);
  (b) the pyrotechnical igniter (12) is inserted into the recess;
  (c) the second housing part (50) is injection-molded onto the pyrotechnical igniter (12) and onto a first end (34) of the first housing part (48), so that a receiving space (24) for the pyrotechnical igniter (12) is essentially closed.

20. The method according to claim 19, wherein the first housing part (48) is produced as an injection-molded part in step (a).

21. The method according to claim 19, wherein in step (b) a press fit develops between the pyrotechnical igniter (12) and a wall (41) of the first housing part (48).

22. The method according to claim 19, wherein in step (b) the pyrotechnical igniter (12) is not fully inserted into the recess, so that the igniter (12) and the first housing part (48) form a pressure chamber (16).

23. The method according to claim 19, wherein during the fabrication of the first housing part (48) a stop for the pyrotechnical igniter (12) is formed in the recess.

24. The method according to claim 19, wherein in step (c) an interlocking connection develops between the pyrotechnical igniter (12) and the second housing part (50).

25. The method according to claim 19, wherein in step (a) the first end (34) of the first housing part (48) is fabricated so as to be profiled such that after the second housing part (50) is joined by injection-molding and is cured, the two housing parts (48, 50) form a non-detachable interlocking connection.

26. A vehicle safety system, comprising:
  a pyrotechnical actuator unit comprising an outer housing (14) having a predefined breaking point (30) adapted to receive a traction means;
  traction means (32) received in the breaking point (30); and
  a pyrotechnical igniter (12) accommodated in the outer housing (14) adjacent the breaking point (30) such that activation of the igniter (12) directly causes the outer housing (14) to rupture at the breaking point (30) and thereby release the traction means (32).

27. A vehicle safety system, comprising:
  a pyrotechnical actuator unit comprising an outer housing (14) having a predefined breaking point (30) adapted to receive a traction means;
  traction means (32) received in the breaking point (30); and
  a pyrotechnical igniter (12) accommodated in the outer housing (14) adjacent the breaking point (30) such that activation of the igniter (12) directly causes the outer housing (14) to rupture at the breaking point (30) and thereby release the traction means (32), wherein the outer housing (14) is made up of a first plastic part (18) and a second plastic part (20), the two plastic parts (18, 20) being permanently connected with each other.

28. A pyrotechnical actuator unit for a vehicle safety system, comprising:
a pyrotechnical igniter (12);
an outer housing (14) for accommodating the pyrotechnical igniter (12), the outer housing (14) comprising a first housing part (48) and a second housing part (50), the first housing part (48) comprising a recess that helps define a receiving space (24) for the pyrotechnical igniter (12), the second housing part (50) being injection-molded onto the pyrotechnical igniter (12) and onto a first end (34) of the first housing part (48), thus essentially closing the receiving space (24) and enclosing the pyrotechnical igniter (12) in the receiving space.

29. A pyrotechnical actuator unit for a vehicle safety system, comprising:
a pyrotechnical igniter (12);
an outer housing (14) for accommodating the pyrotechnical igniter (12), the outer housing (14) comprising a first housing part (48) and a second housing part (50), the first housing part (48) comprising a recess that helps define a receiving space (24) for the pyrotechnical igniter (12), the second housing part (50) being injection-molded onto the pyrotechnical igniter (12) and onto a first end (34) of the first housing part (48), thus essentially closing the receiving space (24) and enclosing the pyrotechnical igniter (12) in the receiving space, wherein the outer housing (14) further comprises predefined breaking point (30) adapted to receive a traction means, the pyrotechnical igniter (12) being accommodated in the outer housing (14) adjacent the breaking point (30) such that activation of the igniter (12) directly causes the outer housing (14) to rupture at the breaking point (30) and thereby release the traction means (32).

\* \* \* \* \*